April 20, 1954  M. J. BORUSHKO  2,675,779
APPARATUS FOR MAKING FILMS
Filed April 22, 1950  2 Sheets-Sheet 1
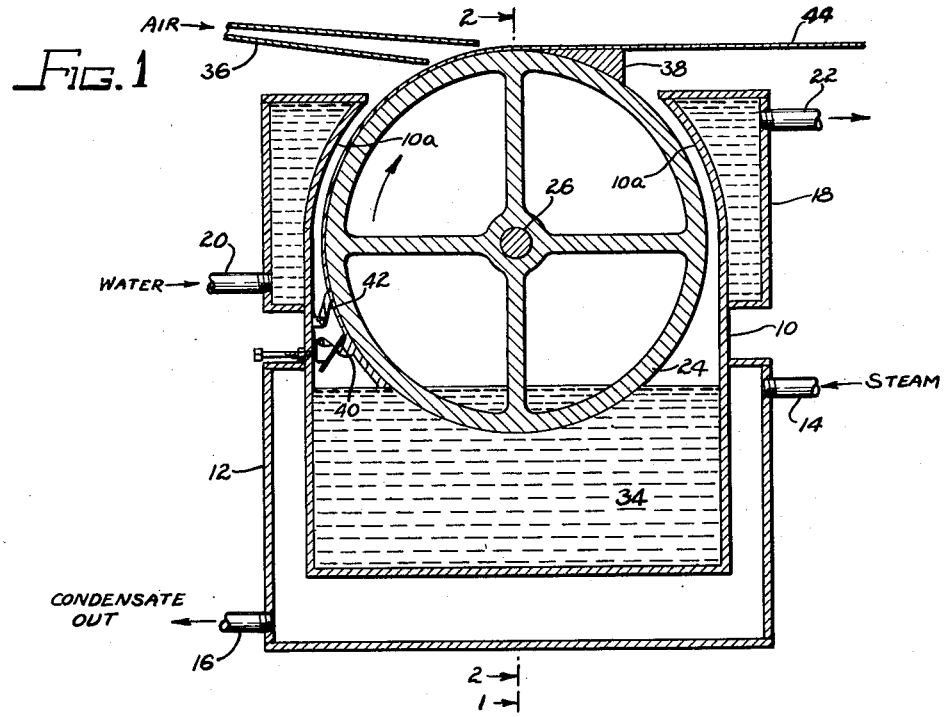
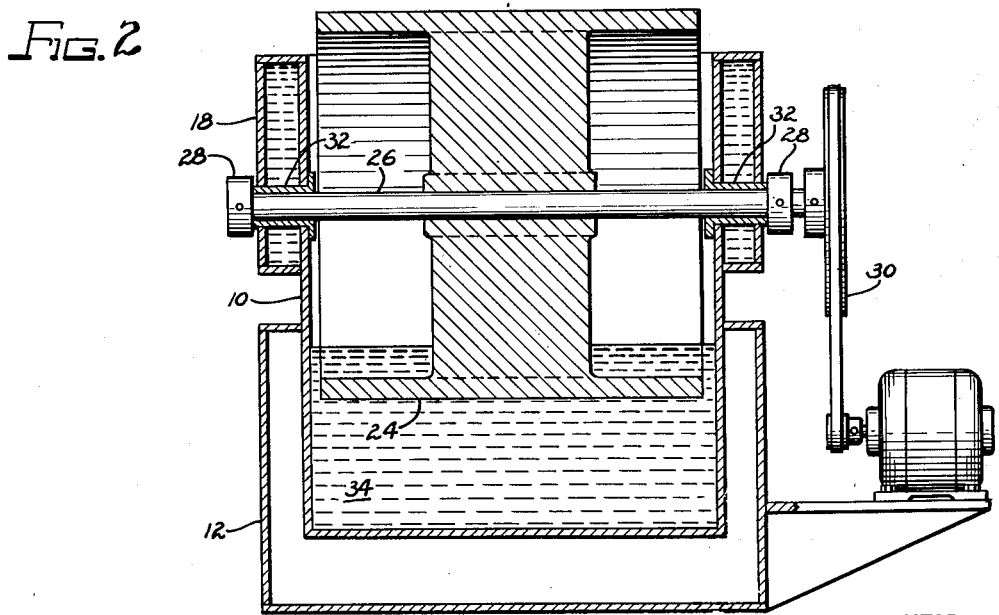
INVENTOR.
Michael J. Borushko
by: Bair, Freeman & Molinare
attys.

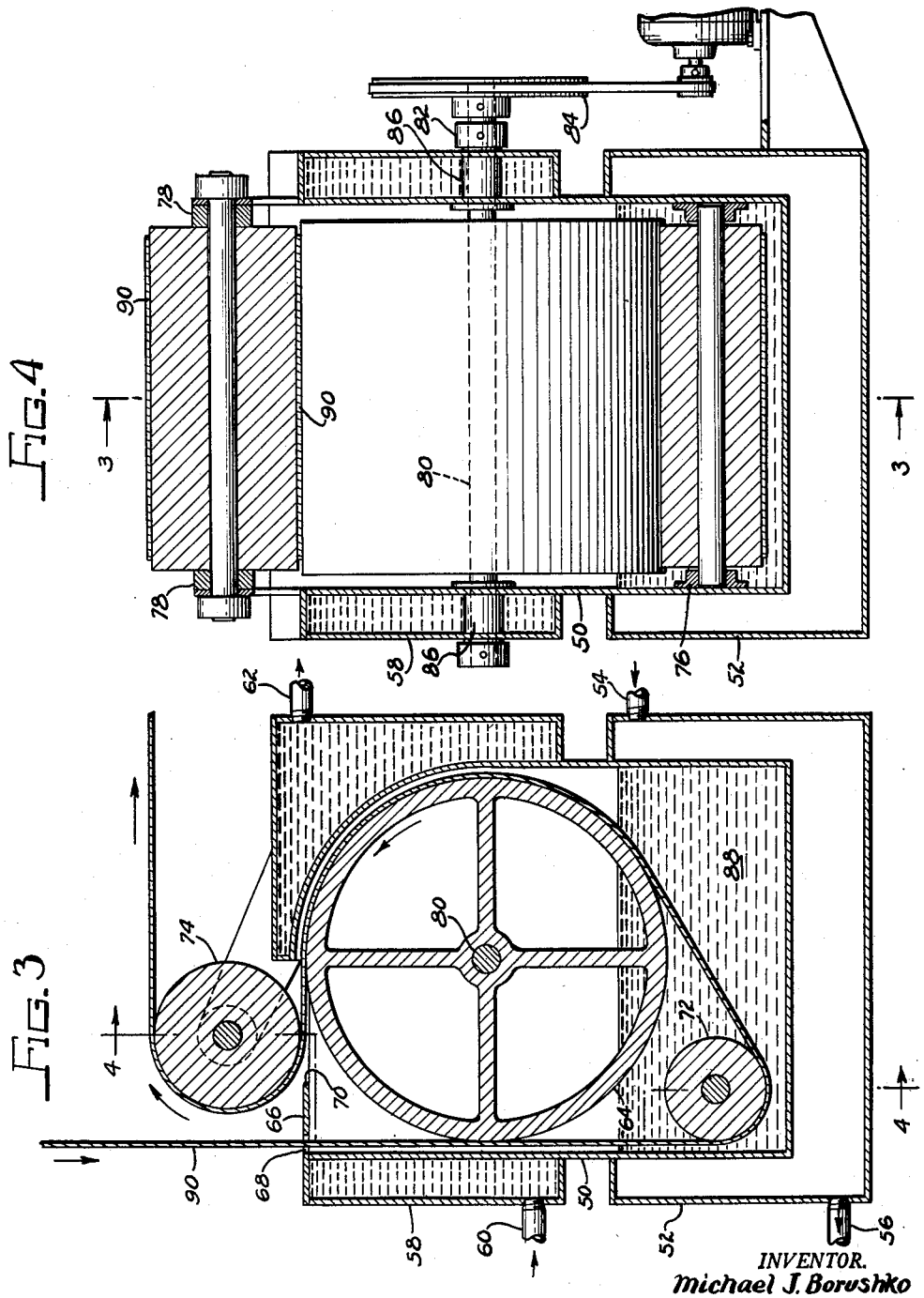

Patented Apr. 20, 1954

2,675,779

UNITED STATES PATENT OFFICE 2,675,779

APPARATUS FOR MAKING FILMS

Michael J. Borushko, Detroit, Mich., assignor to Harding Manufacturing Company, Detroit, Mich., a corporation of Michigan Application April 22, 1950, Serial No. 157,615

4 Claims. (Cl. 118—65)

This invention relates to method and apparatus for making films from a liquid composition including a volatile solvent and a film-forming material dispersed therein.

This application is a continuation-in-part of my co-pending application, Serial No. 679,897, filed June 28, 1946, and entitled "Coating Process" (issued July 18, 1950, as Patent No. 2,515,489). This co-pending application discloses a method of coating articles using a coating composition of the type indicated. For this purpose, the coating composition is contained in the lower portion of an open-topped receptacle and there maintained at an elevated temperature (near or at the boiling point of the solvent) by suitable means, for instance, a steam jacket surrounding the lower portion of the container. The upper portion of the receptacle, on the other hand, is surrounded by a water jacket for keeping the walls of the upper portion cool. The liquid level in the receptacle may extend at about the upper end of the steam jacket. Solvent vapors continuously rise from the hot coating composition but do not enter the space within the water jacket, for the rising vapors are continuously condensed at the lower entrance to the water jacketed upper space. The condensate flows back into the coating composition.

When proceeding according to the method of said co-pending application, the article to be coated is immersed in the hot coating composition for a time sufficient to raise the temperature of the surface of the article to or nearly to the temperature of the coating composition by heat transfer from the latter. Then the article is elevated to the upper water-jacketed space which is substantially free from solvent vapor. There the solvent content of the adhering coating composition is flashed off by rapid evaporation. The surface underlying the coating composition has been heated and supplies the heat required for this rapid volatilization of the solvent. When the coating composition adhering to the dipped article has dried by evaporation of its solvent content, the article is removed from the coating apparatus. The solvent flashed off from the dipped article held in the water jacketed upper space is condensed on contact with the water jacket. This condensate may be allowed to flow back into the coating composition in the lower part of the container.

As disclosed in said co-pending application, a coating may be deposited by the method indicated on a suitable object and then peeled off or stripped from the object, to produce a film or foil material.

The method and apparatus of the present invention are directed to the preparation of such film or foil material. The method and apparatus of the present invention are also directed to the coating or impregnation of webs or strands of thin material having such a limited capacity for retaining heat that the webs or strands cannot be coated or impregnated conveniently by the method disclosed in said co-pending application.

For the purposes indicated, I have provided an apparatus comprising a receptacle capable of containing a liquid solvent-containing film-forming composition in the bottom portion thereof. Heating means are disposed in or at said bottom portion and cooling means are disposed in the upper portion of the receptacle for condensing solvent vapors to maintain the upper portion free from solvent vapors. Up to this point, the apparatus of the present application does not differ from that of the said co-pending application. However, I additionally provide in the apparatus of the present application a drum generally horizontally and rotatably disposed in the receptacle between the bottom and upper portions of the receptacle and having its upper and lower portions projecting, respectively, into the upper and lower receptacle portions.

The method of the present invention is practiced in said apparatus as follows. The drum is continuously rotated to carry a layer of hot liquid film-forming composition above the layer of solvent vapor generated therefrom and into the vapor free space defined in the upper part of the receptacle. The rate of rotation is such that the layer of coating composition is retained within the vapor free space while the heat contained in the drum causes rapid volatilization of the solvent content of this layer to leave a layer of film-forming material. When a film or foil material is to be prepared, I proceed as described and further strip continuously from the drum layer of film-forming material left on the drum after the solvent content of the film-forming material on the drum has been flashed off. When it is a question of coating or impregnating a thin web or strand of flexible material, such a web or strand is passed through the film-forming composition under the drum and while being contacted with the drum carried into and through the vapor free space in the upper part of the receptacle. The heat content of the drum then causes rapid volatilization of the hot film-forming composition adhering to the web or strand. After such volatilization, the web or strand is separated from the upper part of the drum.

It is therefore an important object of the present invention to provide method and apparatus of the nature indicated for preparing films from a liquid film-forming composition including a volatile solvent, either for the purpose of making a film or foil of more or less plastic material or for the purpose of coating or impregnating a web or strand of more or less flexible material.

Other and further objects and features of the present invention will become apparent from the following description and appended claims as illustrated by the accompanying drawings showing, by way of examples, apparatus according to the present invention. More particularly:

Figure 1 is a cross sectional view taken along the line 1—1 of Figure 2 of apparatus according to this invention for preparing plastic film or foil;

Figure 2 is a cross sectional view taken along the line 2—2 of Figure 1;

Figure 3 is a cross sectional view taken along the line 3—3 of Figure 4 showing apparatus according to this invention for coating or impregnating a flexible web; and Figure 4 is a cross sectional view taken along the line 4—4 of Figure 3.

Referring now to Figures 1 and 2, there is shown a receptacle 10 having its bottom portion surrounded by a jacket 12 provided with an upper steam inlet pipe 14 and a lower condensate outlet pipe 16. The upper part of the container 10 is surrounded by a jacket 18 provided with a lower inlet 20 for cold water and an upper water outlet 22.

A drum 24 is fixed to a shaft 26 journalled in bearings 28 outside the container 10 and driven from any suitable source of power, for instance by means of a pulley 30 affixed to the shaft 26. The latter passes through tubes 32 extending through the water jacket 18. Preferably, these tubes 32 fit the shaft 26 fairly closely.

A liquid coating composition 34 fills the lower part of the container 10 approximately level with the upper end of the steam jacket 12. The drum 24 is partially immersed in the coating composition 34. For instance, from one-sixth to one-third of the diameter of the drum 24 may extend below the surface of the coating composition 34. Preferably, but not necessarily, the drum 24 is of such dimensions as to extend and project upwardly beyond the upper rim of the container 10. The upper margin of the container 10 may be curved inwardly, as indicated at 10a, to extend in parallelism with the surface of the drum 24.

When the drum 24 is rotated clockwise, the upper left part of the drum may be cooled, as by means of cold air from a nozzle 36. A stripping knife 38 or other parting tool is provided at the upper right side of the drum 24, for stripping film-forming material from the drum 24.

For controlling the thickness of the layer of film-forming composition carried upwardly by the drum 24, I may provide a scraper or doctor knife 40 adjustable disposed with respect to the lower left side of the drum surface above the level of the coating composition 34. Other knives 42 may be disposed at the margins of the drum 24, for trimming off the edges of the layer of coating composition carried upwardly by the drum 24.

In the apparatus of Figures 1 and 2 the coating composition 34 in the bottom part of the container 10 is maintained at a temperature approaching the boiling point of the solvent in the coating composition. The solvent vapor arising from the coating composition is condensed at the lower edge of the water jacket 18. The space enclosed by the water jacket 18 is substantially free from solvent vapor.

As the drum 24 rotates, the lower part of the drum immersed within the coating composition carries a layer of coating composition upwardly into the vapor free space within the water jacket 18. The width and thickness of this layer can be regulated by adjusting the doctor knife 40 and the knives 42. The excess coating material removed by these knives fall back into the coating composition 34. The solvent content of the layer of coating composition adhering to the drum 24 is flashed off in the above mentioned vapor free space. The heat effecting such rapid volatilization of the solvent is derived from the underlying surface on the drum 24, which has been heated approximately to the boiling point of the solvent when passing through the coating composition 34. The solvent vapor thus flashed off is condensed on the walls of the water jacket 18 and may be returned to the coating composition 34. In this manner, the space within the water jacket 18 is maintained substantially free from solvent vapor.

As the drum 24 rotates, the layer of film-forming material left after the flashing off of the solvent content on the layer of coating composition may be subjected to a blast of cold air from the nozzle 36, to set the film-forming composition. At the top of the drum 24, the layer of film-forming composition may be continuously stripped from the surface of the drum 24 by the stripping tool 38 and continuously removed in the form of a foil or film 44.

In the apparatus of Figures 1 and 2, the heat required for flashing off of solvent from a layer of coating composition is supplied from the heat content of the body of coating composition 34 by the action of the drum 24. Such heat transfer may also be utilized to cause flashing off of solvent content from a layer of coating composition adhering to the relatively thin web or strand of more or less flexible material. Apparatus for this purpose is shown in Figures 3 and 4, which are described hereinbelow.

The apparatus of Figures 3 and 4 includes a receptacle 50 having a bottom portion provided with a jacket 52 with an upper steam inlet 54 and a lower condensate outlet 56. The upper part of the receptacle 50 is surrounded by a jacket 58 having a lower inlet 60 for cold water and an upper water outlet 62.

A drum 64 may be rotatably disposed in the receptacle 50 with from one-sixth to one-third of its diameter projecting down into the space surrounded by the steam jacket 52. The upper part of the drum may reach about to the level of the top of the water jacket 58. The latter may project over the top of the drum 64 to about the middle thereof. A cover member 66 may partially bridge the open space between the top of the container and the overhanging part of the water jacket 58, to define a relatively narrow slot 68 between the top of the water jacket 58 and the cover member 64 and a relatively wider slot 70 between the overhanging part of the water jacket 58 and the cover member 64.

A small drum 72 may be rotatably disposed in a lower left hand corner of the container 50 in parallelism with the drum 64. A second drum 74 may be rotatably disposed above the slot 70 in parallelism with the drum 64. If desired, the drum may be cooled, as by flowing cold water therethrough. The drums 72 and 74 need not be driven and are suitably journalled, respectively, in bearings 76 and 78. The drum 64, on the other hand, is preferably driven, and for this purpose is fixed to a shaft 80 journalled in bearings 82 outside the receptacle 50 and provided with a pulley 84. Tubes 86 passing through the outer jacket 58 receive the shaft 80 with a fairly tight fit.

In the operation of the apparatus of Figures 3 and 4, coating composition 88 in the lower part of the container 50 within the steam jacket 52 is maintained at or near the boiling point of the solvent contained in the coating composition. Solvent vapor rising from the coating composition is condensed at the lower edge of the water jacket 58 and may be returned to the coating composition. A thin endless web or strand 90 is caused to travel downwardly through the slot 66, under the drum 72, over the drum 64 and around the drum 74. The web or strand 90 may be paper, textile material, woven metal wire or the like. The strand or web 90, in passing through the coating composition 88, is coated or impregnated thereby. When emerging from the coating composition 88 and while traveling through the vapor free space enclosed by the water jacket 58, the web or strand 90 is kept in contact with the drum 64. The surface of the latter is heated by contact with the coating composition 88. The heat content of the drum 64 causes rapid volatilization or flashing off of the solvent content of the layer of coating composition adhering to the web or strand 90, leaving the latter coated or impregnated with film-forming material. The solvent vapor flashed off is condensed on the walls of the water jacket 58 and may be returned to the coating composition 88. At the top of the drum 64, the coated or impregnated web or strand 90 leaves the drum 64 and passes out through the slot 70, to travel around the drum 74 and from the latter to any suitable winding roll or reel or the like.

When it is desired to coat or impregnate only one side of the web 90, the latter is not passed around the drum 72 but only around the drum 64. Further, the web 90 is held under longitudinal tension and thereby forcibly held against the drum 64 while immersed in the film-forming composition 88. Thus, only one side of the web 90 will be coated by the film-forming composition. When the web 90 is passed around the drum 72, as shown in Figure 3, then both sides of the web will be coated.

It will be noted that the rotating drums 24 and 64 both serve to transfer the heat required for flashing off of the solvent content of coating composition carried into the upper vapor free chambers of the coating apparatus. Any film-forming material adhering to the drums after the films have been separated therefrom is removed from the drums as on rotation the drum surfaces carrying residual film-forming material are again immersed in the hot coating composition. Thus, the drum surfaces emerging from the coating composition are always clean.

The coating compositions employed when proceeding according to this invention preferably include a solvent forming a vapor substantially heavier than air, such as trichlorethylene or perchlorethylene, although the process is applicable to a wide range of solvents and film-forming material. By way of examples, I may use coating compositions containing 75 parts Vinylite, 5 parts castor oil and 225 parts trichlorethylene, or a coating composition comprising 75 parts ethyl cellulose, 3 parts mineral oil and 300 parts trichlorethylene. The film-forming material removed in forming a plastic foil or strip or in coating a web or strand may be replaced by additions of a concentrate or paste of film-forming material at suitable intervals of time to maintain a suitable concentration of film-forming material in the coating composition.

Many details may be varied within a wide range without departing from the principles of this invention and it is therefore not my purpose to limit the patent granted on this invention otherwise necessitated by the scope of the appended claims.

I claim:

1. Apparatus for making a film comprising a receptacle capable of containing a liquid solvent-containing film-forming composition in a bottom portion thereof; heating means disposed in said bottom portion; cooling means disposed in an upper portion of said receptacle for condensing solvent vapors to maintain said upper portion substantially free from solvent vapors, the lowermost extent of said upper portion of the receptacle being substantially defined by a horizontal plane bounding the lowermost extent of the cooling means and being spaced above the uppermost extent of said bottom portion of the receptacle; and a drum capable of absorbing, retaining and releasing heat generally horizontally and rotatably disposed in said receptacle, said drum being of such a size and being so disposed relative to said bottom portion of the receptacle and to said cooling means that a lower portion of said drum is positioned below the uppermost extent of said bottom portion of the receptacle and an upper portion of said drum is positioned above the lowermost extent of said upper portion of the receptacle within which said cooling means are disposed, whereby portions of said drum, when said drum is rotating, are adapted to advance through a liquid film-forming composition contained in said lower portion of the receptacle and to thereafter advance into said upper portion of the receptacle which is subjected to said cooling means.

2. Apparatus for making a film comprising a receptacle capable of containing a liquid solvent-containing film-forming composition in a bottom portion thereof; heating means disposed in said bottom portion; cooling means disposed in an upper portion of said receptacle for condensing solvent vapors to maintain said upper portion substantially free from solvent vapors, the lowermost extent of said upper portion of the receptacle being substantially defined by a horizontal plane bounding the lowermost extent of the cooling means and being spaced above the uppermost extent of said bottom portion of the receptacle; a drum capable of absorbing, retaining and releasing heat generally horizontally and rotatably disposed in said receptacle, said drum being of such a size and being so disposed relative to said bottom portion of the receptacle and to said cooling means that a lower portion of said drum is positioned below the uppermost extent of said bottom portion of the receptacle and an upper portion of said drum is positioned above the lowermost extent of said upper portion of the receptacle within which said cooling means are disposed, whereby portions of said drum, when said drum is rotating, are adapted to advance through a liquid film-forming composition contained in said lower portion of the receptacle and to thereafter advance into said upper portion of the receptacle which is subjected to said cooling means; and a second drum of smaller diameter than said first drum generally horizontally and rotatably disposed in the bottom portion of said receptacle in general parallelism with said first drum.

3. Apparatus for making a film comprising a receptacle capable of containing a liquid solvent-containing film-forming composition in a bottom portion thereof; heating means disposed in said bottom portion; cooling means disposed in an upper portion of said receptacle for condensing solvent vapors to maintain said upper portion substantially free from solvent vapors, the lowermost extent of said upper portion of the receptacle being substantially defined by a horizontal plane bounding the lowermost extent of the cooling means and being spaced above the uppermost extent of said bottom portion of the receptacle; a drum capable of absorbing, retaining and releasing heat generally horizontally and rotatably disposed in said receptacle, said drum being of such a size and being so disposed relative to said bottom portion of the receptacle and to said cooling means that a lower portion of said drum is positioned below the uppermost extent of said bottom portion of the receptacle and an upper portion of said drum is positioned above the lowermost extent of said upper portion of the receptacle within which said cooling means are disposed, whereby portions of said drum, when said drum is rotating, are adapted to advance through a liquid film-forming composition contained in said lower portion of the receptacle and to thereafter advance into said upper portion of the receptacle which is subjected to said cooling means; a second drum of smaller diameter than said first drum generally horizontally and rotatably disposed in the bottom portion of said receptacle in general parallelism with said first drum; and a third drum generally horizontally and rotatably disposed above said receptacle in general parallelism with said first drum.

4. Apparatus for making a film comprising a receptacle capable of containing a liquid solvent-containing film-forming composition in a bottom portion thereof; heating means disposed in said bottom portion; cooling means disposed in an upper portion of said receptacle for condensing solvent vapors to maintain said upper portion substantially free from solvent vapors, the lowermost extent of said upper portion of the receptacle being substantially defined by a horizontal plane bounding the lowermost extent of the cooling means and being spaced above the uppermost extent of said bottom portion of the receptacle; a drum capable of absorbing, retaining and releasing heat generally horizontally and rotatably disposed in said receptacle, said drum being of such a size and being so disposed relative to said bottom portion of the receptacle and to said cooling means that a lower portion of said drum is positioned below the uppermost extent of said bottom portion of the receptacle and an upper portion of said drum is positioned above the lowermost extent of said upper portion of the receptacle within which said cooling means are disposed, whereby portions of said drum, when said drum is rotating, are adapted to advance through a liquid film-forming composition contained in said lower portion of the receptacle and to thereafter advance into said upper portion of the receptacle which is subjected to said cooling means; and a second drum generally horizontally and rotatably disposed above said receptacle in general parallelism with said first drum.

References Cited in the file of this patent

UNITED STATES PATENTS

| Number | Name | Date |
|---|---|---|
| 564,353 | Wagg | July 21, 1896 |
| 1,008,607 | Mellinger et al. | Nov. 14, 1911 |
| 2,117,200 | Miller | May 10, 1938 |
| 2,351,271 | Leguillon | June 13, 1944 |
| 2,515,489 | Borushko | July 18, 1950 |
| 2,547,047 | Saums et al. | Apr. 3, 1951 |

OTHER REFERENCES

Egan—The Paper Industry and Paper World, December 1944, pages 1142–1146.